(12) United States Patent
Meier et al.

(10) Patent No.: US 10,940,729 B2
(45) Date of Patent: Mar. 9, 2021

(54) MULTI-LINK AXLE FOR A MOTOR VEHICLE

(71) Applicant: Ford Global Technologies, LLC, Dearborn, MI (US)

(72) Inventors: Christoph Meier, Cologne (DE); Alberto Girelli Consolaro, Aachen (DE); Paul Zandbergen, Würselen (DE); Ivica Papic, Nordrhein Westfalen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 152 days.

(21) Appl. No.: 16/212,812

(22) Filed: Dec. 7, 2018

(65) Prior Publication Data

US 2019/0176554 A1 Jun. 13, 2019

(30) Foreign Application Priority Data

Dec. 12, 2017 (DE) .......................... 102017222487.8

(51) Int. Cl.
*B60G 3/20* (2006.01)
*B60G 11/08* (2006.01)
(Continued)

(52) U.S. Cl.
CPC ............... *B60G 3/202* (2013.01); *B60G 3/28* (2013.01); *B60G 11/08* (2013.01); *B60G 11/10* (2013.01);
(Continued)

(58) Field of Classification Search
CPC ........ B60G 2204/121; B60G 2202/114; B60G 2202/413; B60G 11/08
See application file for complete search history.

(56) References Cited

U.S. PATENT DOCUMENTS

| 4,858,950 | A | 8/1989 | Kajiwara et al. |
| 5,217,248 | A | 6/1993 | Reast |
| 6,378,881 | B2 | 4/2002 | Stenvall |
| 8,505,942 | B2 | 8/2013 | Muck |

(Continued)

FOREIGN PATENT DOCUMENTS

| DE | 102010022895 A1 | 12/2011 |
| DE | 102016212551 A1 | 1/2018 |

(Continued)

OTHER PUBLICATIONS

Roadmaster Active Suspension Systems 3621.

*Primary Examiner* — Nicole T Verley
(74) *Attorney, Agent, or Firm* — Raymond L. Coppiellie; Burgess Law Office, PLLC

(57) ABSTRACT

A motor vehicle multi-link axle having wheel suspension including a lower transverse link and an upper transverse link. A leaf spring extending transversely to a direction of travel of the vehicle and below the upper transverse link. A link element connects an end of the leaf spring to the upper transverse link. The link element having a first connection, connected to the upper transverse link, and a second connection, connected to the leaf spring. The link element adjustable to vary the distance between the first connection and the second connection. The multi-link axle may also include a connecting element that connects the second connection point of the link element to a connection point of the leaf spring, with the connecting adjustable to vary the distance between the second connection point of the link element and the connection point of the connecting element to the leaf spring.

5 Claims, 6 Drawing Sheets

(51) Int. Cl.
  *B60G 11/10* (2006.01)
  *B60G 17/02* (2006.01)
  *B60G 17/015* (2006.01)
  *B60G 3/28* (2006.01)
  *B60G 11/12* (2006.01)

(52) U.S. Cl.
  CPC .......... *B60G 11/12* (2013.01); *B60G 17/0157* (2013.01); *B60G 17/023* (2013.01); *B60G 2200/182* (2013.01); *B60G 2202/114* (2013.01); *B60G 2202/412* (2013.01); *B60G 2202/413* (2013.01); *B60G 2202/42* (2013.01); *B60G 2202/43* (2013.01); *B60G 2204/121* (2013.01)

(56) References Cited

U.S. PATENT DOCUMENTS

| | | | |
|---|---|---|---|
| 8,678,410 B2 | 3/2014 | Sjoesten et al. | |
| 8,979,105 B2 | 3/2015 | McCarthy et al. | |
| 9,162,546 B2 * | 10/2015 | Girelli Consolaro | B60G 7/006 |
| 9,643,464 B2 * | 5/2017 | Zandbergen | B60G 11/113 |
| 10,112,649 B2 * | 10/2018 | Rogers | B60G 15/068 |
| 10,144,260 B2 * | 12/2018 | Durkovic | B60G 13/006 |
| 2006/0255556 A1 | 11/2006 | Reast | |
| 2019/0092113 A1 * | 3/2019 | Girelli Consolaro | B60G 11/08 |
| 2020/0307331 A1 * | 10/2020 | Senoo | B60G 11/08 |

FOREIGN PATENT DOCUMENTS

| | | | |
|---|---|---|---|
| KR | 20160069842 A | 6/2016 | |
| WO | WO9627507 A1 | 9/1996 | |
| WO | WO2016119930 A1 | 8/2016 | |

* cited by examiner

MULTI-LINK AXLE FOR A MOTOR VEHICLE

CROSS-REFERENCE TO RELATED APPLICATIONS

Not Applicable.

BACKGROUND OF THE INVENTION

1. Field of the Invention

The present invention relates generally to an axle for a vehicle; and more specifically to multi-link axle including a control arm and a leaf spring.

2. Description of Related Art

Many conventional vehicle systems are negatively influenced by changes in the height level arising from changes in vehicle loading. For example, heavy loads on a rear seat or in a trunk affects rear axle loads and corresponding axle level, lower to the ground, of the vehicle. Level changes caused by different loadings are frequently problematic for vehicles. The level change influences aerodynamic properties, headlight illumination, impact damping of the suspension, wheel alignment (track, camber), ground clearance, and other vehicle properties.

Suspension designs have an inherent conflict; if the springs are soft, although the vehicle is comfortable, loading greatly affected the suspension. If the springs are hard or stiff, the vehicle is less comfortable, but less affected by loading. Customarily, ground clearance may be achieved using height-adjustable spring seats or a pneumatic suspension.

SUMMARY OF THE INVENTION

A multi-link axle for a vehicle including a wheel suspension having a lower transverse link and an upper transverse link, the upper and lower transverse links connected to a wheel carrier. A leaf spring extends transversely to a direction of travel of the vehicle and below the upper transverse link. A link element connects at a first connection to the upper transverse link and at a second connection to the leaf spring. An actuator adjusts a distance between the first connection of the link element to the upper transverse link and the second connection of the link element to the leaf spring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
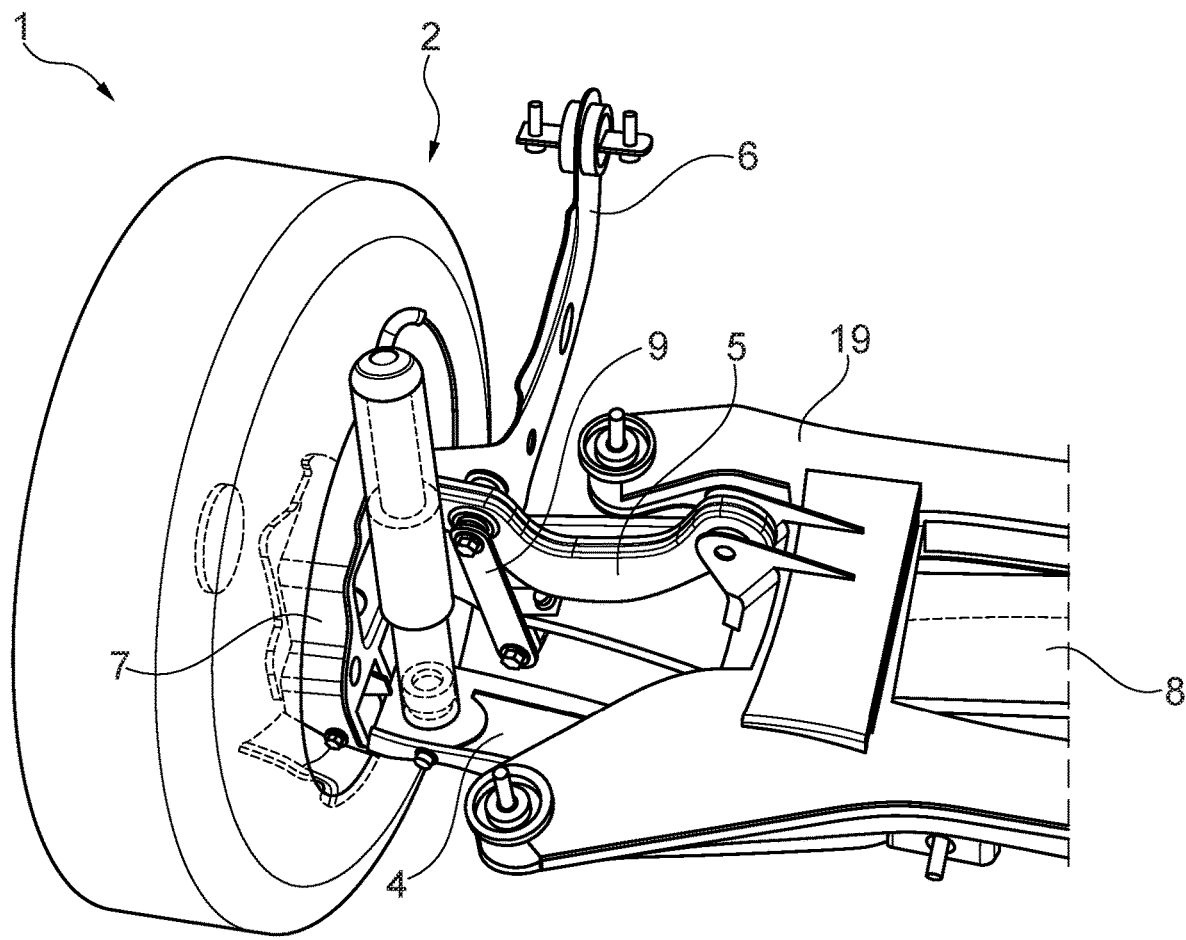
FIG. 1 is a top, perspective view of a multi-link axle for a vehicle.
Figure 2:
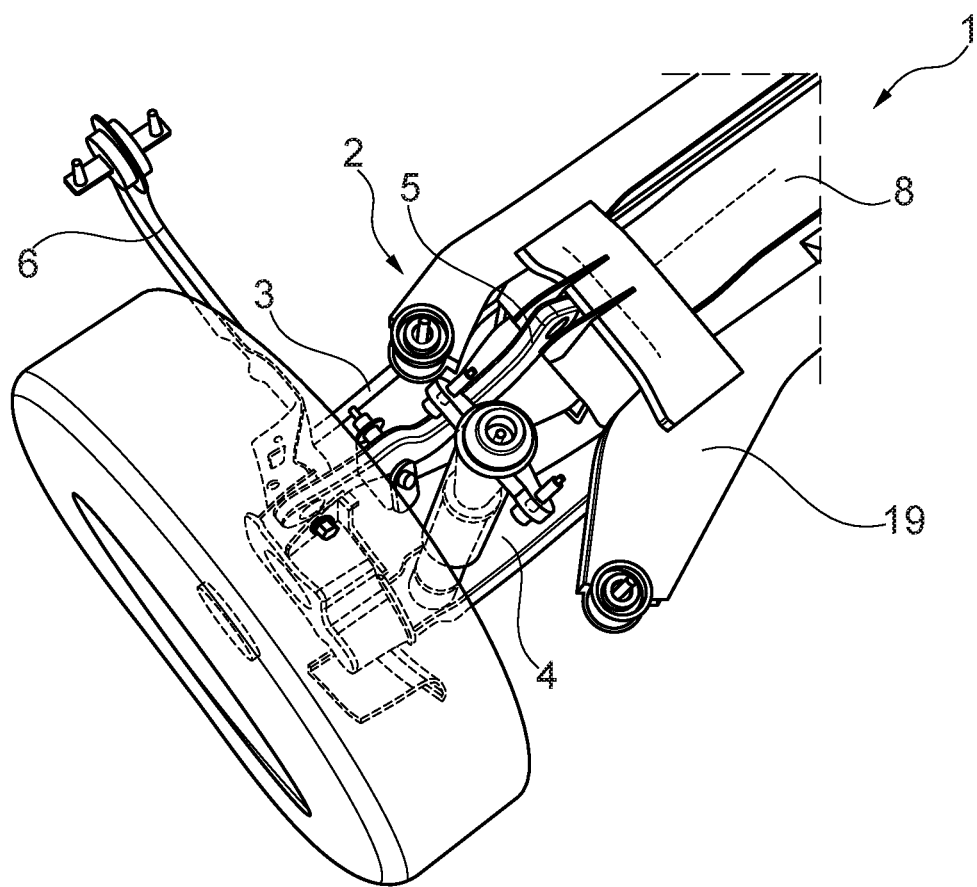
FIG. 2 is an additional top, perspective view of FIG. 1.
Figure 3:
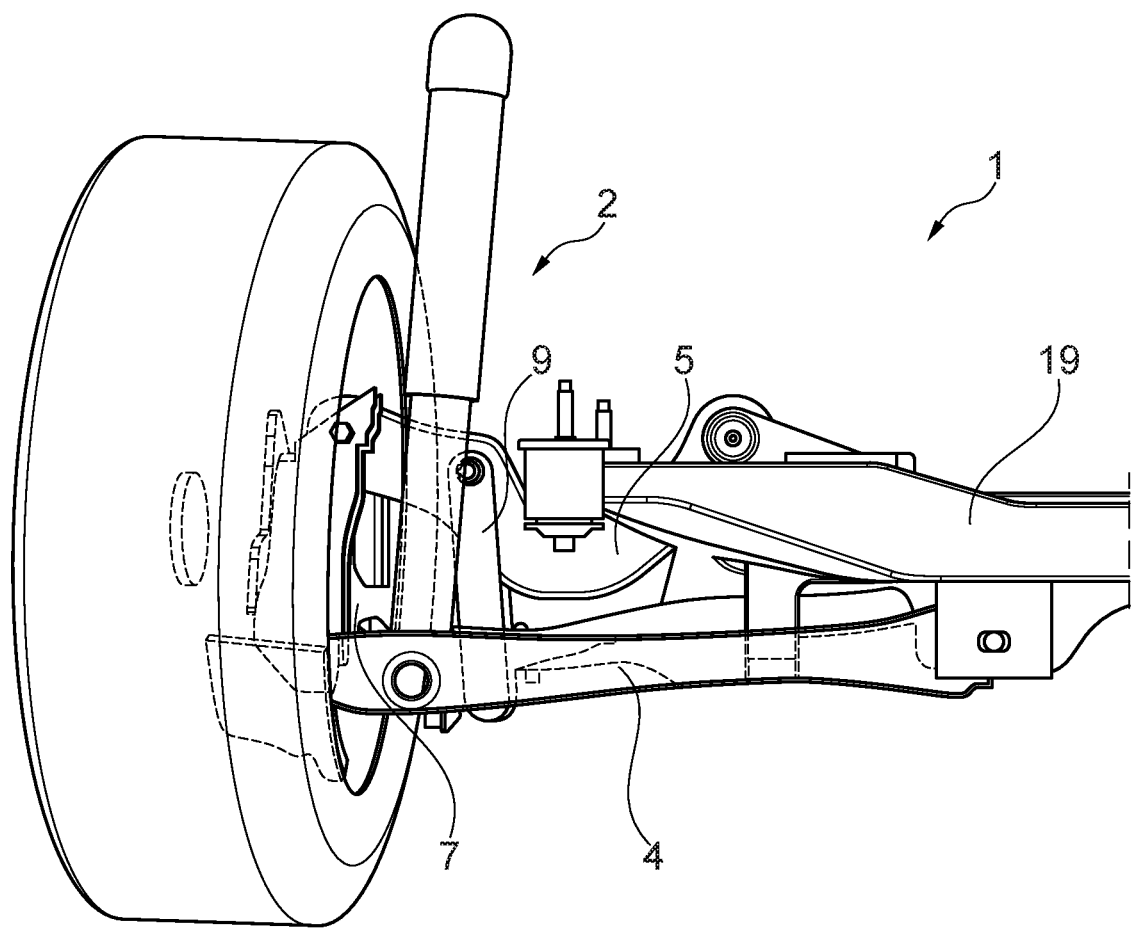
FIG. 3 is a rear view of the multi-link axle of FIG. 1.
Figure 4:
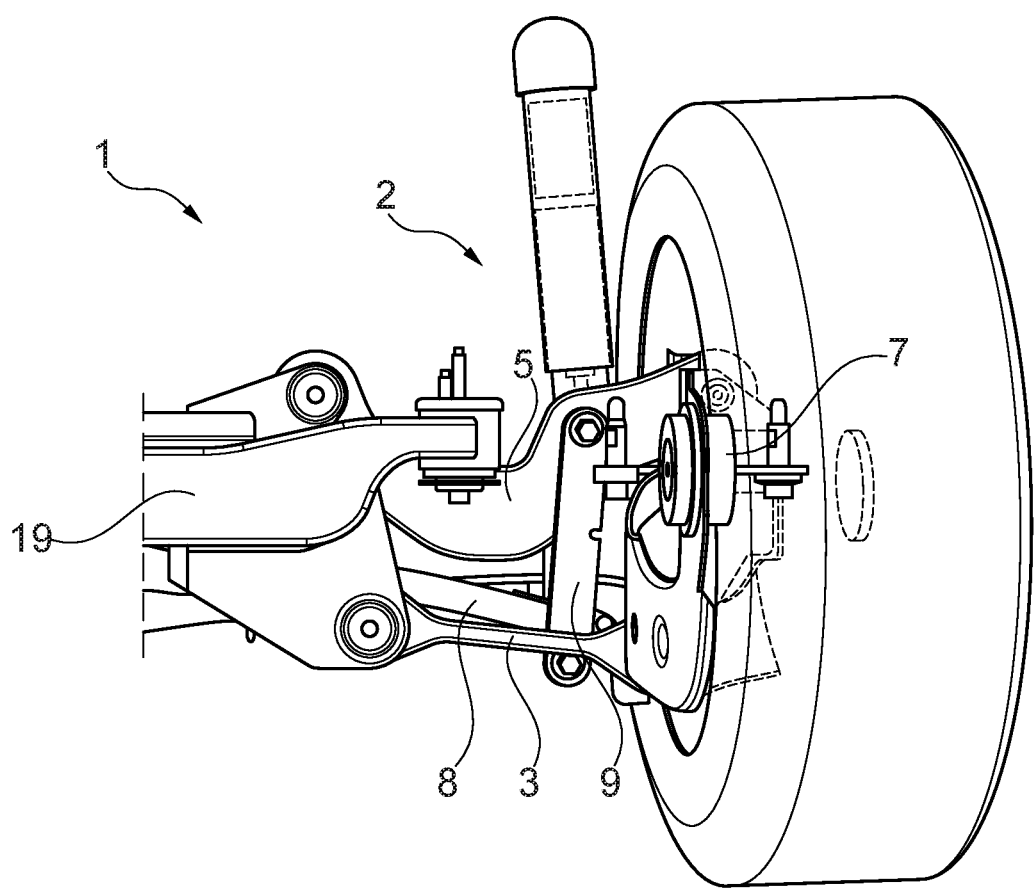
FIG. 4 is a front view of the multi-link axle of FIG. 1.

The following description of the preferred embodiment(s) is merely exemplary in nature and is in no way intended to limit the invention, its application, or uses. In the various figures, identical parts are always provided with the same reference signs, and therefore said parts are generally also only described once.

FIGS. 1 to 4 show a basic design of a wheel suspension 2 of a multi-link axle 1 for a vehicle. The multi-link axle 1, has on each side, a wheel suspension 2. Each wheel suspension having a front lower transverse link 3, a rear lower transverse link 4, an upper transverse link 5 and a control link 6. The wheel suspension 2 arranged in a customary manner on both sides of the vehicle, wherein the opposite wheel suspension (not shown) is identical in a mirror-inverted manner.

Each of the transverse links 3, 4, 5 and the control link 6 are connected on one end to a wheel carrier 7. In each case, the transverse links 3, 4 and 5 are joined, transversely to a longitudinal direction of the vehicle, via bearing bushings at joints or points of articulation, to the wheel carrier 7. The control link 6 can be formed integrally with the wheel carrier 7. A wheel is fastened in a known manner to each wheel carrier 7.

The three transverse links 3, 4 and 5 extend parallel to one another and substantially horizontally and transversely to a longitudinal axis of the vehicle. Each of the transverse links 3, 4, 5 joined at the body side, opposite the wheel carrier side 7, to a frame element 19 of the vehicle. Bearing bushes are at the respective joints or points of articulation on the frame element 19 and are opposite the joints or points of articulation on the wheel carrier 7. The control link 6 is formed from a blade-like plate and articulates on the body side via a bearing bushing on a frame element or on a body of the vehicle. The control link 6 is pivotably mounted on the body of the vehicle about a horizontal axis perpendicular to the longitudinal axis of the vehicle.

The wheel suspension 2 has a damper and a spring element, a helical spring, supporting wheel suspension 2 in relation to the vehicle body or the frame element 19. The spring element is held in a spring plate formed by the rear, lower transverse link 4.

A leaf spring 8 is provided between the respective wheel suspensions 2 on each side of the vehicle. The leaf spring 8 extends transversely to the longitudinal axis of the vehicle or transversely to the direction of travel of the vehicle. The leaf spring 8 positioned below the upper transverse link 5. Each end of the leaf spring 8 includes a link element 9 connecting the leaf spring 8 to a respective upper transverse link 5.

Figure 5:
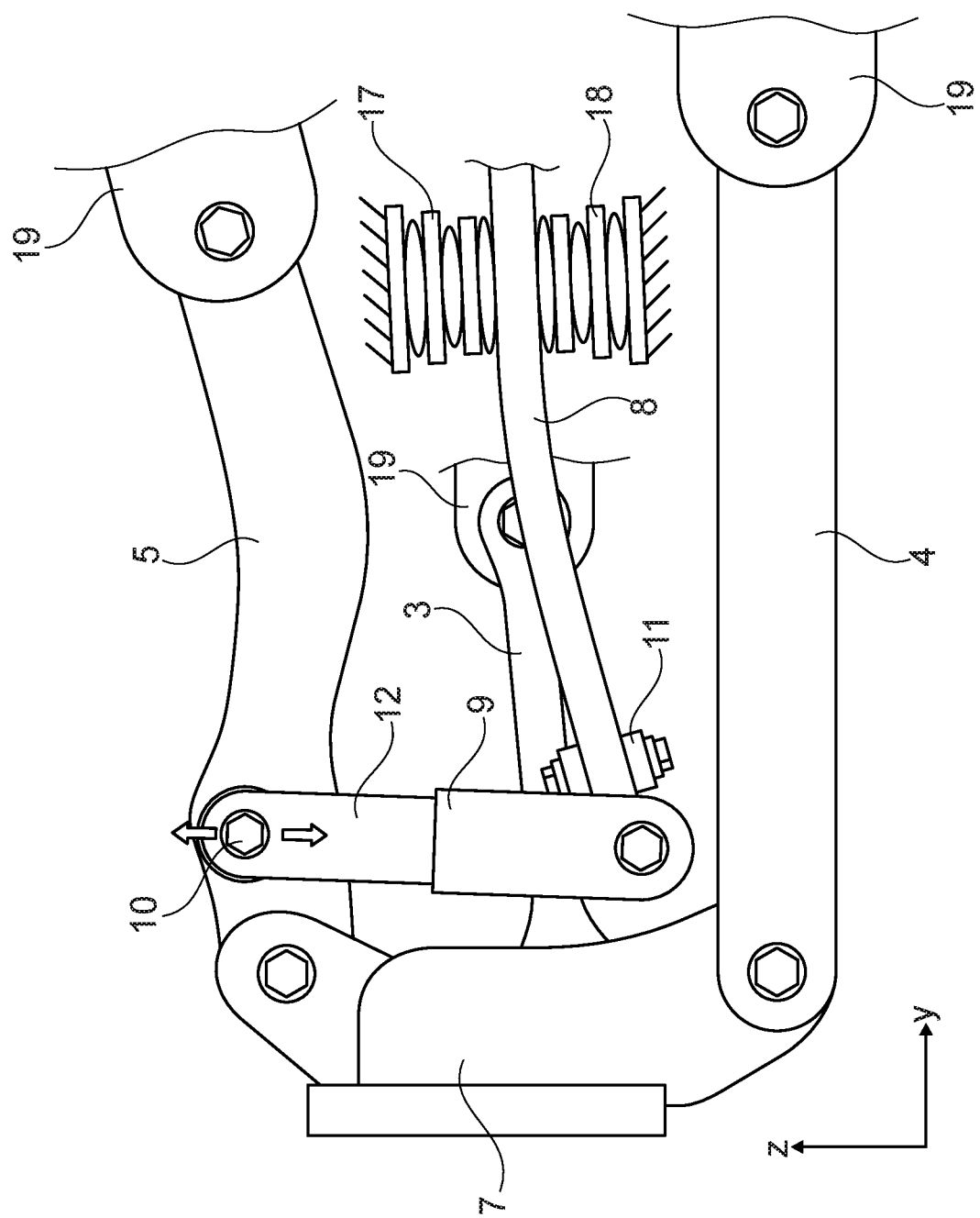
FIG. 5 is a rear view of a first embodiment of a multi-link axle according to the present invention.

FIG. 5 shows a rear view of a first embodiment of a multi-link axle 1 for a vehicle including a wheel suspension 2. The link element 9 has a first connection or connection point 10, connected to the upper transverse link 5, and a second connection or connection point 11, connected to the leaf spring 8. As used herein, the term "connection" refers to something that connects or a state of being connected, and as used herein the term "point" refers to a place or locality. For example, the link element 9 has something that connects it at a place thereon to a place on the upper transverse link. The multi-link axle 1 includes mechanism 12 adjusting a vertical distance between the first connection point 10 of the link element 9 and the second connection point 11 of the link element 9. In one example, the mechanism 12 adjusting the distance is a length-adjustable actuator that adjusts the overall length of the link element 9 and correspondingly the distance between the first connection point 10 of the link element 9 and the second connection point 11 of the link element 9. As shown in FIG. 5, the link element 9 has a portion thereof fixed or connected to the upper transverse link 5 and a portion thereof fixed or connected to the leaf spring 8. Changing the length of the link 9, changes the vertical position of the first connection point 10, shown by the double arrow at the first connection point 10. The change made possible by the portion of the link element 9 fixed or connected to the upper transverse link 5 being movable relative to the portion of the link element 9 fixed or connected to the leaf spring 8. In another example, the portion of the link element 9 fixed or connected to the leaf spring 8 could move relative to the portion of the link element 9 fixed or connected to the upper transverse link 5. The link element 9 is an actuator or part of an actuator. As illustrated, the distance between the first connection point 10 of the link element 9 and the second connection point 11 of the link element 9 extends substantially vertically; i.e., in a direction of the plane of the drawing and from the bottom upward to obtain a direct adjustment of the ground clearance. Other examples include the link element 9 being a piston-cylinder unit, with link element 9 formed by the piston movable in the cylinder. The piston-cylinder unit can be controlled hydraulically, pneumatically, mechanically and/or electrically. Similarly, actuator may act or be actuated hydraulically, pneumatically, mechanically and/or electrically.

Figure 6:
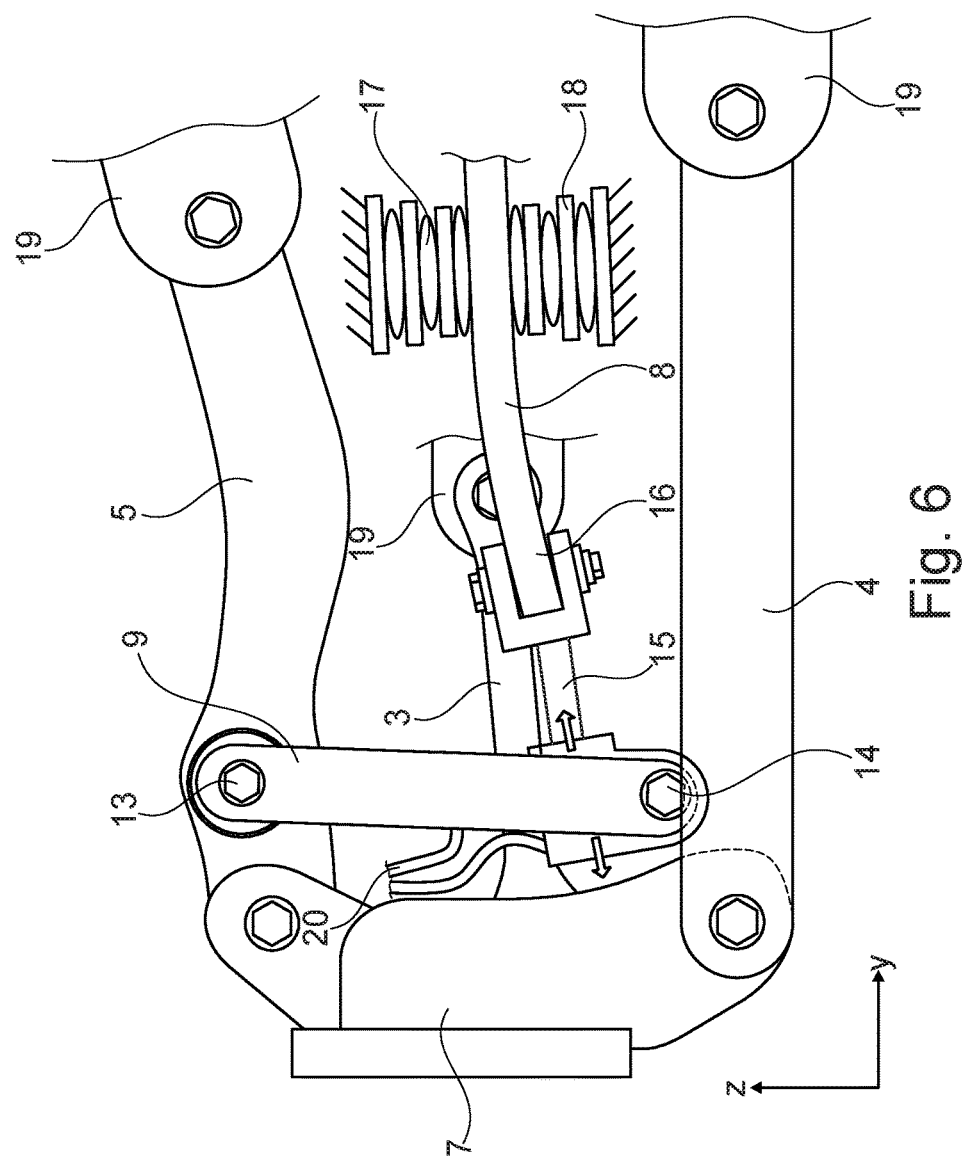
FIG. 6 is a rear view of a second embodiment of a multi-link axle according to the present invention.

FIG. 6 is a second embodiment of a multi-link axle 1 for a vehicle with a wheel suspension 2. The multi-link axle includes a connecting element 15 connecting a third connection or connection point 14 of the link element 9 to a second connection or connection point 16 of the connecting element 15 and the leaf spring 8. The length of the connecting element 15 is adjustable, wherein a distance between the third connection point 14 of the link element 9 and the connection point 16 of the leaf spring 8 is adjustable. The connecting element 15 is rigidly connected on both sides, at connection points 14, 16, to the link element 9 and the leaf spring 8. The distance between the third connection point 14 of the link element 9 and the connection point 16 of the leaf spring 8 extends substantially horizontally, i.e., along a longitudinal axis of the leaf spring 8 or transversely to the longitudinal direction of the vehicle. Generally, the term first connection refers to a connection between the link element 9 and the upper transverse link 5; the term second connection refers to a connection between the leaf spring 8 and another member—the link element 9 in the first embodiment and the connecting element 15 in the second embodiment; and the term third connection refers to a connection between the link element 9 and another member—the leaf spring 8 in the first embodiment and the connecting element 15 in the second embodiment.

The connecting element 15 is designed as a length-adjustable actuator, and therefore a distance between the third connection or connection point 14, of the link element 9 to the connecting element 15, and the second connection or connection point 16, of the leaf spring 8 to the connecting element, is adjustable. For example, the actuator is a hydraulic, linear actuator connected to a hydraulic pressure source by hydraulic tubes 20. The actuator can also act or be actuated pneumatically, mechanically and/or electrically.

The multi-link axle 1 of the second alternative embodiment operates such that when the distance between the third connection point 14 of the link element 9 and the connection point 16 of the leaf spring 8 is increased, the moment on the leaf spring 8 is increased, leading to a reduction in the ground clearance. In a corresponding manner, a reduction in the distance between the third connection point 14 of the link element 9 and the connection point 16 of the leaf spring 8 brings about an increase in the ground clearance; i.e. the driving height, since the moment acting on the leaf spring 8 is reduced.

In both embodiments the leaf spring 8 is mounted resiliently between the wheel suspensions 2 by two bearings 17, 18 supported on the frame element 19 of the vehicle. Changing the position of the two bearings 17, 18 along the leaf spring, optionally using an actuator, may also influence vehicle ground clearance. A pair, the two bearings 17, 18, can be provided on opposite side or portions of the leaf spring 8, and therefore each wheel suspension 2 has two bearings 17, 18.

In a further example, the features of the first and the second embodiments may be combined with one another. The multi-link axle 1 having an adjustable link element 9 adjusting the distance between the first connection point 10 of the link element 9 and the second connection point 11 of the link element 9 in the vertical direction and an adjustable connecting element 15 connects the third connection point 14 of the link element 9 to the connection point 16 of the leaf spring 8. Wherein the length of the connecting element 15 is horizontally adjustable so the distance between the third connection point 14 of the link element 9 and the connection point 16 of the leaf spring 8 is adjustable. Combining both embodiments results in greater flexibility in ground clearance adjustment.

Each embodiment affords the advantage of a lightweight, compact and cost-effective construction. In the first embodiment, active roll stabilization can additionally be implemented because of the combined function of the leaf spring and the actuator, if the actuator has a sufficiently rapid response behavior. In the second embodiment, a spring rate or a wheel spring rate can be adjusted to adapt the dedicated frequency of the wheel suspension to the changed vehicle weight.

In the first embodiment, the multi-link axle for a vehicle has, on both sides, a respective wheel suspension having a lower transverse link, an upper transverse link, and optionally a control link. The transverse link and the optional control link each arranged with one of their ends on a wheel carrier. A leaf spring arranged between the wheel suspensions transversely to the direction of travel of the vehicle runs below the upper transverse link. A link element connects on each end or end portion of the leaf spring to the respective upper transverse link. The link element has a first connection point, connected to the upper transverse link, and a second connection point, connected to the leaf spring. The link includes a mechanism adjusting a distance between the first connection point of the link element and the second connection point of the link element. Adjusting the respective distance correspondingly adjusts the ground clearance under the loading without the comfort being affected because of a reduced spring deflection.

The distance between the first connection point of the link element and the second connection point of the link element preferably extends substantially vertically. Vertical extension makes it possible to adjust the ground clearance directly in the vertical direction. An actuator, adjusting the length of link element is one mechanism adjusting the distance between the first connection point of the link element and the second connection point of the link element. The link element can have a part or portion fixed to the leaf spring and a part or portion fixed to the upper transverse link with the parts relatively movable. The actuator may act on the part fixed to the upper transverse link or on the part fixed to the leaf spring. Because the link element is or functions as an actuator the first connection point is adjustable in its height since the actuator acts in a corresponding manner. A combined function of the leaf spring and the actuator enables additional implementation of an active roll stabilization if the actuator has a sufficiently rapid response behavior.

In the disclosed embodiments, an actuator is an element capable of, for example, exerting forces and/or carrying out movements in a controlled manner; e.g., hydraulic cylinder, piezo element, vacuum capsule, etc.

In the second embodiment, the multi-link has, on both sides, a respective wheel suspension having at least one lower transverse link, an upper transverse link, and optionally a control link. The transverse link and the optional control link are each arranged with one of their ends on a wheel carrier. A leaf spring, arranged between the wheel suspensions transversely to the direction of travel of the vehicle, runs below the upper transverse link. A link element connects the end or end portion of the leaf spring to a respective upper transverse link. The link element has a first connection point, connected to the upper transverse link, and a second connection point, connected to the leaf spring. A connecting element connects the second connection point of the link element to a connection point of the leaf spring. The length of the connecting element is adjustable making a distance between the second connection point of the link element and the connection point of the leaf spring adjustable. Adjusting the distance also adjusts the ground clearance in a manner corresponding to the loading without the comfort being substantially affected because of a reduced spring deflection. Changing the length of the connecting element, using the actuator to adjust the length of the connecting element, adjusts the moment lever, and together with the force due to the vehicle weight, changes the moment that brings about sagging of the spring can be changed. By extending the connecting element, the moment applied to the spring is increased, leading to a reduction in the ground clearance; i.e., the drive height. Shortening the connecting element increases the ground clearance; i.e., the drive height, since the moment is reduced. The spring rate or the wheel spring rate can be adjusted. For example, if the vehicle weight is high, the spring rate or the wheel spring rate can be increased to achieve the same frequency of an unloaded vehicle.

The distance between the second connection point of the link element and the connection point of the leaf spring preferably extends substantially horizontally enabling adjustment of the sag of the leaf spring and therefore the ground clearance. The connecting element may be an actuator that adjusts or varies in length in such a manner it adjusts a distance between the second connection point of the link element and the connection point of the leaf spring. The actuator may be a hydraulic, linear actuator. In one example, an actuator is an element capable of, for example, exerting forces and/or carrying out movements in a controlled manner; e.g., hydraulic cylinder, piezo element, vacuum capsule, etc.

The leaf spring is preferably mounted resiliently between the wheel suspensions by two bearings supported on a frame element of the vehicle. The spring constant of the leaf spring can therefore be adjusted.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multi-link axle for a vehicle comprising:
    a wheel suspension including a lower transverse link and an upper transverse link, the upper and lower transverse links connected to a wheel carrier;
    a leaf spring extending transversely to a direction of travel of the vehicle, said leaf spring being running below the upper transverse link;
    a link element connected at a first connection to the upper transverse link;
    a connecting element connected at a second connection to the leaf spring, said link element and said connecting element connected at a third connection to each other; and
    an actuator adjusting a distance between the third connection and the second connection.

2. The multi-link axle of claim 1 wherein the distance between the second connection and the third connection is adjustable in a substantially horizontal direction.

3. The multi-link axle of claim 1 wherein the connecting element is a length-adjustable actuator varying the distance between the second connection and the third connection.

4. The multi-link axle of claim 1 wherein the actuator is a hydraulic, linear actuator.

5. The multi-link axle of claim 1 including an adjuster, said adjuster varying a distance between the first connection and the second connection.

* * * * *